April 10, 1928.
J. R. GAMMETER ET AL
1,665,848
PRECISION ADJUSTMENT DEVICE
Filed Sept. 13, 1922
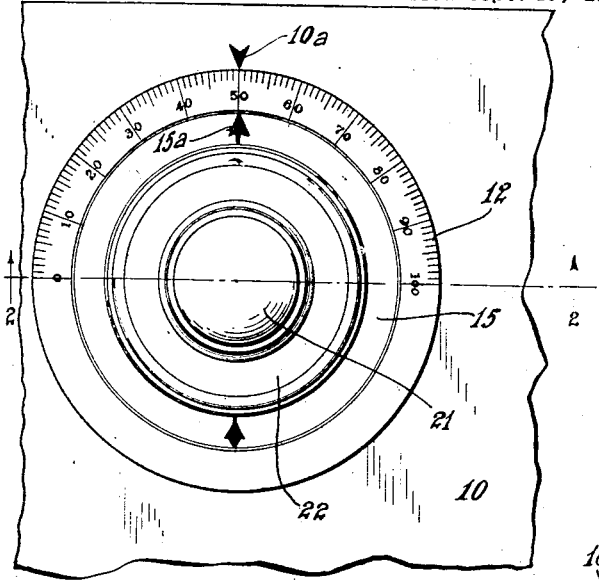
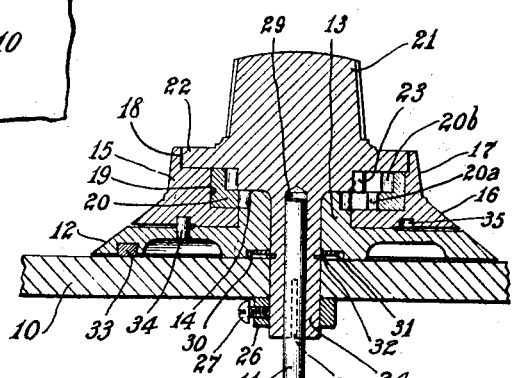
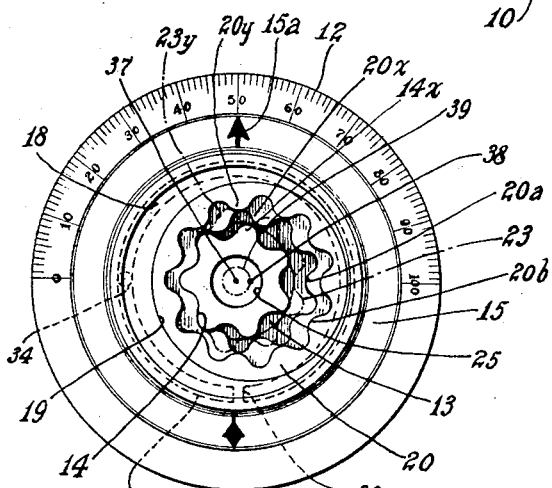
Inventors,
John R. Gammeter,
Charles C. Cadden
By Robert M Pierson
Atty.

Patented Apr. 10, 1928.

1,665,848

UNITED STATES PATENT OFFICE.

JOHN R. GAMMETER AND CHARLES C. CADDEN, OF AKRON, OHIO, ASSIGNORS TO THE B. F. GOODRICH COMPANY, OF NEW YORK, N. Y., A CORPORATION OF NEW YORK.

PRECISION ADJUSTMENT DEVICE.

Application filed September 13, 1922. Serial No. 587,922.

This invention relates to devices for obtaining accurate angular positioning of rotatable elements, particularly the rotatable elements associated with the tuning devices of radio-telephone receiving stations, wherein the rotor must be in exactly the proper angular relation to the stator to obtain maximum audibility in the receiver, and where the variation of a fraction of one degree in said angular relation may impair the resonance of the apparatus. The present invention is an improvement upon that described and claimed in the copending application of John R. Gammeter, Serial No. 587,928, filed September 13, 1922, on a precision adjustment device.

The chief object of our invention is to provide a compact, self contained device by means of which an instrument requiring precision in the relative angular adjustment of its parts may be quickly adjusted to a nicety.

Another object is to provide such a device which may be cheaply made of molded, dielectric material such as hard rubber, one advantage of such construction being that where it is used in connection with sensitive electrical apparatus, it does not augment the capacity effect of the operator's body upon the instrument.

Of the accompanying drawings:

Fig. 1 is a plan view of our device.

Fig. 2 is a section on the line 2—2 of Fig. 1.

Fig. 3 is a plan view similar to Fig. 1 with parts removed for clearness of illustration.

Referring to the drawings, 10 is the panel board of an instrument cabinet, such as usually contains several of the instruments used for radio-telephone receiving stations, and 11 is a shaft from the rotatable element of one of said instruments requiring to be rotated when said instrument is adjusted to resonance with a particular transmitting station. The shaft 11 projects through an aperture in the instrument panel and is associated with an adjustment device of which 12 is a main dial, substantially frusto-conical in shape, having its tapered surface graduated providing a scale for registry with an indicator 10$^a$ on the panel board and another indicator hereinafter described, said main dial being formed with a relatively high, annular, axial boss 13, the outer end of which is provided with an integral gear pinion 14 shown here as having seven teeth.

Journaled on the boss 13 is an auxiliary or intermediate dial 15 having a conical surface 16 which is a continuation of the conical surface of the main dial 12, said conical surface 16 terminating in an approximately cylindrical structure 17, and said dial being provided with an indicator 15$^a$. The outer face of the dial 15 has a relatively shallow, concentric counter-bore 18, and a relatively deep, eccentric counter-bore 19 extending inward therefrom, said eccentric counter-bore 19 serving as a peripheral journal for an internal gear ring 20, said gear ring 20 comprising two integral, concentric gears, 20$^a$ and 20$^b$, the gear 20$^a$ having, as here shown, nine teeth, and the gear 20$^b$ having 11 teeth, the gear 20$^a$ being in mesh with the pinion 14.

A knurled hand-knob 21 provided with an annnular flange 22 adapted rotatably to seat within the counter-bore 18 of the auxiliary dial 15 is formed, on the under side of said flange, with an integral, co-axial gear pinion 23, here shown as having nine teeth, said pinion being adapted to mesh with the internal gear 20$^b$, the several gears, as here shown and described, constituting what may be termed a planetary or epicyclic train of differential reduction gears.

A stem 24 integral with the knob 21 extends through an axial aperture 25 in the main dial 12, and projects through the aperture in the panel board 10. A collar 26 secured by a set-screw 27, on said stem within said cabinet, retains the device in place on said panel board. The stem 24 is slotted at its outer end as shown at 28 and is provided with an axial bore 29 in which is mounted the shaft 11, the latter being secured against relative movement in said stem by the collar 26 and set-screw 27, which compress the slotted end of the stem upon the shaft.

The previously mentioned gears 14, 20$^a$, 20$^b$ and 23 having teeth of special shape, being substantially semi-circular at crown and root, such shape providing strength in the teeth although they are made from relatively brittle material. Such shape also practically eliminates back-lash and the possibility of binding as the teeth withdraw from engagement with each other. However, we do not wish to limit ourselves wholly to any particular shape of tooth or to any particular gear ratios, except as required to obtain the results desired.

In the rear face of the main dial 12 is a shallow, axial recess 30 adapted to receive a washer 31 on the stem 24, said washer being held in place by a loop of spring wire 32 encircling said stem and resting in a circumferential groove therein. The washer and spring-wire thus serve to hold the device together so that it may be removed as a unit from the panel-board simply by loosening the set-screw 27 and removing the collar 26, thereby releasing the device from the shaft 11.

The rear face of the main dial 12 also is provided with an inset plug 33 of friction material, adapted to bear against the surface of the panel-board with sufficient pressure to insure that said dial will remain stationary except when intentionally rotated. Projecting from the front face of the main dial is a stud 34 slidably fitting in a concentric annular groove 35 in the rear face of the auxiliary dial 15, said groove having a transverse abutment 36 therein to limit the relative rotation of said auxiliary dial to substantially one revolution, for a purpose hereinafter stated.

In the operation of our device either the knob 21 or the main dial 12 is rotated to obtain approximately the desired adjustment, substantial relative movement between said dial and knob being prevented by reason of the fact that the gears, as described, are interlocked against such relative movement so long as the intermediate dial 15 is not turned with relation to the knob or the main dial. Precise adjustment is then obtained by rotating, in either direction as required, the auxiliary dial 15, which, through the intermediate planetary gearing, rotates the knob and attached shaft 11, but through a much smaller angle. By recording the readings of indicators $10^a$ and $15^a$ on the calibrations of the main dial it is an easy matter subsequently to duplicate any particular setting of the instrument. The stud 34, by limiting the turning of the auxiliary dial to one revolution with relation to the main dial, and thus compelling a resetting of the main dial for larger adjustments, assures that the setting of the device may always be recorded from a simple reading of the indicators, without the necessity of recalling whether the auxiliary dial was turned through more than one revolution.

The differential action of the several gears in so driving the knob can best be understood by reference to Fig. 3, where 37 is the axis common to the gears 14 and 23 and 38 is the eccentric axis common to the gears $20^a$, $20^b$ of the gear ring 20. Assuming the parts to be in the positions shown, with the mesh point, as to all gears, at the left of the figure and the eccentric axis 38 therefore at the right of the axis 37, one complete revolution of the intermediate dial 15, clockwise, for example, will cause the axis 38 to make one complete revolution about the axis 37, following the orbit 39, and the mesh point likewise to make one complete revolution about the stationary, seven-toothed gear 14. During such revolution of the mesh point, it will of course pass all seven teeth of the stationary gear 14 and the same number, seven, of the nine teeth upon the gear $20^a$, although returning to the same position with regard to said stationary gear. The eighth tooth of the nine-toothed gear $20^a$ will therefore occupy the position originally occupied by its first tooth, which is to say that it has been driven or crowded forward, clockwise, through a distance of two of its own nine teeth, or 2/9 of a revolution. Such crowding action can best be visualized by noting the positions of the teeth designated $14^x$ and $20^x$ and contemplating the downward movement of the axis 38, the gear 14 being held stationary.

During this complete revolution of the intermediate dial 15, the eleven-toothed gear $20^b$, being integral with the gear $20^a$, is likewise driven clockwise through 2/9 of a revolution on its own axis 38, but it does not drive the gear 23, with which it is meshed, the same distance, by reason of a relatively backward lag of the latter due to the revolution of the axis 38 and consequently of their mesh point, which lag may, for clearness, be considered as a relatively backward crowding of the gear 23 by the gear $20^b$, as in fact it is if there be driving friction between said gears apart from their teeth. Such relatively backward crowding action can best be visualized by noting the positions of the teeth marked $20^y$ and $23^y$ and contemplating the downward movement of the axis 38, while remembering, however, that the gear $20^b$ is turning clockwise, although at a relatively slow angular speed compared with the angular speed of the axis 38 about the axis 37.

Quantitatively, such relatively backward crowding of the gear 23 would obviously be equal to two of its own nine teeth, or 2/9 of a revolution with respect to the gear $20^b$, if the mesh point made a complete revolution about the latter, but by reason of the 2/9 revolution of the latter forward, its mesh point, ending as well as starting at the left of the figure, travels only 7/9 of one revolution around the gear $20^b$, wherefore the relatively backward crowding of the gear 23 is only 7/9 of 2/9 revolution, or 14/81 revolution. The difference between this and the 2/9 forward revolution of the gear $20^b$ is 4/81 revolution, representing the actual movement of the knob 21 and shaft 11 resulting from one complete revolution of the intermediate dial 15.

The device is self contained, the gears all being completely inclosed, wherefore they are protected from injury and the device presents a neat appearance. As the indicator 15ª registers the movement of the most rapidly moving part of the speed reduction means, the use of such devices as a magnifying glass or a vernier scale is rendered unnecessary.

The differential gears, being of the type in which the speed reduction varies inversely with relation to the difference in the size of the gears, a very great speed reduction may be had without the use of very large or very small gears, and consequently with compact structure as well as with few parts. We prefer the specific form of gears shown in the drawings, but modifications are possible without wholly sacrificing the advantages just set forth.

We claim:

1. In a precision adjustment device the combination of an instrument mounting having mounted thereon a rotary part to be angularly adjusted, a dial member journaled concentrically with relation to said part, an internally toothed gear ring journaled peripherally on said dial member and eccentrically with relation to said part, means constituting drive connection from said gear ring to said instrument mounting and means constituting drive connection from said gear ring to said part.

2. In a precision adjustment device, the combination of an instrument mounting having mounted thereon a rotary part to be angularly adjusted, a dial member journaled concentrically with relation thereto, a set of differential gears interposed operatively between said dial member and said part, and a second dial member journaled concentrically with relation to the first said dial member and adapted to actuate said differential gears to rotate said part with relation to the first said dial member.

3. In a precision adjustment device the combination of an instrument mounting having mounted thereon a rotary part to be angularly adjusted, a spur gear concentric and non-rotatable with relation to said part, a dial member journaled concentrically with relation to said part, an internal gear carried by said dial member, and surrounding the axis of said spur gear, and a fulcrum gear meshed with said internal gear and adapted to cause said internal gear to drive said spur gear at reduced angular speed with relation to that of said dial member when the latter is manually rotated.

4. In a precision adjustment device the combination of an instrument mounting having mounted thereon a rotary part to be angularly adjusted, a spur gear concentric and non-rotatable with relation to said part, a dial member journaled concentrically with relation to said part, an internal gear carried by said dial member, and surrounding the extended axis of said spur gear, another dial member journaled concentrically with relation to said part and adapted to be rotated therewith at the same angular speed, fulcrum means on the last said dial member, and a gear mechanism operatively connecting said spur gear and said internal gear and adapted to act against said fulcrum means to drive said spur gear at reduced angular speed with relation to that of the first said dial member when the latter is manually rotated, the second mentioned dial member with said fulcrum means thereon being held stationary.

5. In a precision adjustment device, the combination of an instrument mounting having mounted thereon a rotary part to be angularly adjusted, a dial member journaled concentrically with and adapted to be rotated with said part, means for securing said dial member in different angular positions, and a set of differential reduction gears carried by said dial member and adapted to rotate said part with relation to said dial member.

6. In a precision adjustment device, the combination of an instrument mounting having mounted thereon a rotary part to be angularly adjusted, a dial member journaled concentrically with and adapted to be rotated with said part, means for securing said dial member in different angular positions, and a set of differential gears carried by said member and adapted to rotate said part with relation to said member, the differential ratio or ratios of said gears being such as substantially to interlock said member and said part against relative rotary movement as to any force acting between them except through said gears.

7. In a precision adjustment device, the combination of an instrument mounting having mounted thereon a rotatable part to be angularly adjusted, a stationary pinion concentric therewith, a member concentric with said part and rotatable with relation thereto, an internally toothed gear ring having driving connection with said part, said gear ring being meshed with said stationary pinion, peripherally journaled on said member, and eccentric with relation thereto.

8. In a precision adjustment device the combination of an instrument mounting having mounted thereon a rotatable part to be angularly adjusted, a pinion concentric and non-rotatable with relation thereto, a stationary pinion concentric with said part, a dial member concentrically journaled with respect to said part, a gear ring peripherally and eccentrically journaled on said dial member, said gear ring having two sets of internal teeth differing in number of teeth, one set of said teeth being meshed with the pinion which is concentric and non-rotatable with respect to said part and the other set of said teeth being meshed with said stationary pinion.

9. In a precision adjustment device, the combination of an instrument mounting having mounted thereon a rotatable part to be angularly adjusted, a dial member journaled concentrically with relation to and adapted to be rotated with said part, speed reduction means carried by said dial member for rotating said part with relation to said dial, a scale or indicator so positioned as directly to register the movement of one of the more rapidly moving parts of said speed reduction means, and means for limiting the rotation of said more rapidly moving part to not more than one complete revolution with relation to said scale or indicator.

In witness whereof we have hereunto set our hands this 7 day of September, 1922.

JOHN R. GAMMETER.
CHARLES C. CADDEN.